UNITED STATES PATENT OFFICE 2,340,716

BASIC SODIUM ZINC CHROMATE PIGMENT

Alfred E. Van Wirt and Robert E. Lalor, Glens Falls, N. Y., assignors to Imperial Paper and Color Corporation, Glens Falls, N. Y., a corporation of New York No Drawing. Application April 26, 1941,
Serial No. 390,574

5 Claims. (Cl. 23—56)

This invention relates to basic zinc chromate pigments, and has for its object the provision of an improved method of making an improved basic sodium zinc chromate pigment.

Basic potassium zinc chromate pigment, better known commercially as Zinc Yellow, is used extensively as a rust inhibitive pigment in primers, not only for iron and steel, but also for aluminum and magnesium alloys. It has to a large extent, particularly in the aircraft industry, replaced red lead as a rust inhibitive pigment. Basic potassium zinc chromate pigment is usually made by treating a slurry of zinc oxide with a concentrated solution of potassium bichromate followed by the addition to the resulting mixture of sulphuric acid or other equivalent acid. The precipitated pigment is recovered by filtering and drying.

It has long been recognized that the substitution of sodium bichromate for potassium bichromate would effect a marked economy in the cost of producing the basic zinc chromate pigment, but no economically satisfactory method of manufacturing a corresponding basic sodium zinc chromate pigment has heretofore been available or known. If sodium bichromate is substituted for potassium bichromate in the heretofore customary procedure, an unsatisfactory pigment of low yield results. Accordingly, in spite of its apparently lower cost, no basic sodium zinc chromate has heretofore been commercially available in the art.

We have discovered that by adding a substantial excess of sodium bichromate to a zinc oxide slurry, a very satisfactory pigment with a good yield can be obtained without the addition of any acid at the end. Based on that discovery, our present invention involves the production of a basic sodium zinc chromate pigment by reacting zinc oxide in water with a substantial excess of acid sodium chromate above that required to produce a pigment containing not less than the equivalent of 40% $CrO_3$ and not more than the equivalent of 45% ZnO. By "acid sodium chromate" we mean the chemical equivalent of any proportional combination of sodium chromate ($Na_2CrO_4$) and chromic anhydride ($CrO_3$). Zinc oxide is intended to include any compound of zinc and oxygen including zinc hydroxide, with or without combined water. The amount of acid sodium chromate employed should be substantially in excess of that required to give a finished pigment containing the equivalent of at least 40% chromium trioxide ($CrO_3$) and the equivalent of not more than 45% zinc oxide (ZnO). The precipitate resulting from the reaction of the zinc oxide in water and the excess acid sodium chromate is separated from the associated mother liquor, by filtration or the like, and the separated precipitate is washed, if desired, and dried and ground in the conventional manner. The amount of water employed and the excess of acid sodium chromate should be such that the mother liquor of the precipitating step, or the filtrate of the filtering step, contains at least 8% soluble sodium chromate calculated as $Na_2Cr_2O_7 \cdot 2H_2O$, at a pH between 5 and 9, and preferably contains at least 11% soluble chromate, at a pH between 6 and 8. The pH of the mother liquor or filtrate as expressed by the aforementioned pH figures results merely from the ions formed by the zinc oxide, sodium chromate and water present in the filtrate and not from other acid or base. The soluble chromate in the mother liquor or filtrate is recovered in any appropriate manner, such for example as by acidifying and recovering the resulting sodium bichromate by fractional crystallization.

The mixing and reacting of the zinc oxide in water and the acid sodium chromate may be carried out in any convenient manner. If the mixture is sufficiently thin, a tank provided with appropriate agitating means may be used. With certain consistencies, the mixing may be carried out in a ball mill, while dough type mixers may be used when the amount of water employed is very small. The amount of water employed is not critical. However, such an amount of water should be employed that the concentration of the soluble chromate in the mother liquor at the end of the reaction is not less than 8%, with a hydrogen ion concentration preferably near the neutral point.

In practicing the invention, we have obtained excellent results by reacting an approximately 15% aqueous slurry of zinc oxide (ZnO) with sodium bichromate.

$$(Na_2Cr_2O_7 \cdot 2H_2O)$$

preferably about 2½ parts by weight of sodium bichromate per part by weight of zinc oxide. The following example illustrates such a practice of the invention:

2900 pounds of water are introduced into a tank equipped with an agitator. 400 pounds of zinc oxide (ZnO) are added to the water and the mixture is agitated until a uniform aqueous slurry of the zinc oxide is produced. 1000 pounds of sodium bichromate ($Na_2Cr_2O_7 \cdot 2H_2O$) is then added to the slurry, and agitation is continued until the reaction is complete. The resulting precipitate is filtered, dried and ground. The yield of finished pigment is about 950 pounds. Employing zinc oxide and sodium bichromate in the ratio of 1:2.5, as in this example, the finished pigment may be chemically represented by the following empirical formula:

$$Na_2O \cdot 4ZnO \cdot 4CrO_3 \cdot 3H_2O$$

The pigment is of excellent quality, is only slightly soluble in water, possesses satisfactory rust inhibiting properties, and is of comparatively low cost.

We claim:

1. The method of producing a basic sodium zinc chromate pigment which comprises reacting zinc oxide in water with a substantial excess of an acid sodium chromate above that required to produce a pigment containing at least the equivalent of 40% $CrO_3$ and not more than the equivalent of 45% ZnO, the pH of the mother liquor resulting merely from the ions of the zinc oxide, the sodium chromate and water, no acid having been added to the liquor, separating the resulting precipitate from the associated liquor, the ratio of the combined bases to the chromic oxide in the precipitate being greater than one, and drying and grinding the separated precipitate.

2. The method of producing a basic sodium zinc chromate pigment which comprises reacting zinc oxide in water with an acid sodium chromate, the amount of water and acid sodium chromate being such that the resulting liquor contains at least 8% soluble chromate calculated as $Na_2Cr_2O_7 \cdot 2H_2O$ at a pH of 5 to 9, separating the resulting precipitate containing at least the equivalent of 40% $CrO_3$ and not more than the equivalent of 45% ZnO from the associated liquor, the ratio of the combined bases to the chromic oxide in the precipitate being greater than one, and drying and grinding the separated precipitate.

3. The method of producing a basic sodium zinc chromate pigment which comprises reacting zinc oxide in water with an acid sodium chromate, the amount of water and acid sodium chromate being such that the resulting liquor contains at least 11% soluble chromate calculated as $Na_2Cr_2O_7 \cdot 2H_2O$ at a pH of 6 to 8, without the addition of an acid separating the resulting precipitate from the associated liquor, the ratio of the combined bases to the chromic oxide in the precipitate being greater than one, and drying and grinding the separated precipitate.

4. The method of producing a basic sodium zinc chromate pigment which comprises reacting an aqueous slurry of zinc oxide with sodium bichromate, the amount of water in the aqueous slurry and the amount of sodium bichromate being such that the resulting liquor contains at least 8% soluble chromate calculated as $$Na_2Cr_2O_7 \cdot 2H_2O$$

at a pH of 5 to 9, separating the resulting precipitate containing at least the equivalent of 40% $CrO_3$ and not more than the equivalent of 45% ZnO from the associated liquor, the ratio of the combined bases to the chromic oxide in the precipitate being greater than one, and drying and grinding the separate precipitate.

5. The method of producing a basic sodium zinc chromate pigment which comprises reacting an approximately 15% aqueous slurry of zinc oxide with sodium bichromate, the amount of sodium bichromate by weight being about 2.5 times that of the zinc oxide, thereby providing a liquor of the required acidity merely from the ions formed by the zinc oxide, sodium chromate and water present in the filtrate and not from other acid or base, separating the resulting precipitate from the associated liquor, the ratio of the combined bases to the chromic oxide in the precipitate being greater than one, and drying and grinding the separated precipitate.

ALFRED E. VAN WIRT.
ROBERT E. LALOR.

CERTIFICATE OF CORRECTION.

Patent No. 2,340,716. February 1, 1944.

ALFRED E. VAN WIRT, ET AL.

It is hereby certified that error appears in the printed specification of the above numbered patent requiring correction as follows: Page 2, second column, line 6, claim 3, after the numeral "8" strike out the comma and insert the same after "acid" in line 7, same claim; line 27, claim 4, for "separate" read --separated--; and that the said Letters Patent should be read with this correction therein that the same may conform to the record of the case in the Patent Office.

Signed and sealed this 25th day of April, A. D. 1944.

Leslie Frazer

(Seal)　　　　　　　　　　　　Acting Commissioner of Patents.